(12) United States Patent
Fujiwara

(10) Patent No.: US 7,809,706 B2
(45) Date of Patent: Oct. 5, 2010

(54) INFORMATION DISPLAY APPARATUS AND META-INFORMATION DISPLAY METHOD

(75) Inventor: Masato Fujiwara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 314 days.

(21) Appl. No.: 11/852,859

(22) Filed: Sep. 10, 2007

(65) Prior Publication Data

US 2008/0071795 A1   Mar. 20, 2008

(30) Foreign Application Priority Data

Sep. 14, 2006   (JP) .............................. 2006-249956

(51) Int. Cl.
*G06F 7/00* (2006.01)
*G06F 17/30* (2006.01)
(52) U.S. Cl. ...................... 707/706; 707/707
(58) Field of Classification Search ................... 707/10, 707/100; 715/500; 711/171; 709/202
See application file for complete search history.

(56) References Cited

U.S. PATENT DOCUMENTS 6,453,404 B1 * 9/2002 Bereznyi et al. ............. 711/171

2002/0052913 A1 * 5/2002 Yamada et al. .............. 709/202
2005/0257130 A1 * 11/2005 Ito .......................... 715/500.1

OTHER PUBLICATIONS

Digital Living Network Alliance Overview and Vision—White Paper—Jun. 2004 (http://www.dlna.org/industry/about/DLNA_Overview.pdf).

* cited by examiner

*Primary Examiner*—Charles Rones
*Assistant Examiner*—Fariborz Khoshnoodi
(74) *Attorney, Agent, or Firm*—Canon USA Inc IP Division

(57) ABSTRACT

An apparatus receives meta-information from a plurality of external apparatuses, and caches the received meta-information per external apparatus that is the origin of the meta-information. Then, the meta-information cached per external apparatus is consolidated, and display of the meta-information is managed. Based on this display management, display management information corresponding to the meta-information cached per external apparatus is obtained, and the external apparatus to which a request for the meta-information is to be made is selected based on the display management information and the cache status of the meta-information per external apparatus. Then, the meta-information is requested from the selected external device.

11 Claims, 11 Drawing Sheets

INFORMATION DISPLAY APPARATUS AND META-INFORMATION DISPLAY METHOD

BACKGROUND OF THE INVENTION

1. Field of the Invention

The present invention relates to an information display apparatus and a meta-information display method that acquires meta-information of content from content servers spread across a network and displays the meta-information.

2. Description of the Related Art

Recently, devices that store digital video content which can then be browsed, such as DVD recorders that include a hard drive, have become increasingly common. While the main function of a DVD recorder is digitally recording a television broadcast and allowing a user to view the recorded broadcast, some DVD recorders make possible the storage and browsing of personal content from digital still cameras, digital video cameras, or the like.

Furthermore, systems in which content stored in a plurality of digital video content servers is centrally managed and browsed, such as the Digital Living Network Alliance (DLNA) and media servers, are also becoming widespread. There are systems in which stored digital video content is transferred, decoded in real time, and viewed, using a local area network environment installed within a household. It is thus possible to retrieve/view digital content without knowing which server the content is stored.

In general, with such systems, when generating a content retrieval screen, meta-information concerning all content stored in all content servers is collected, and the generation of the retrieval screen is carried out when the meta-information has been collected (refer to Digital Living Network Alliance Overview and Vision—White Paper—June 2004 (http://www.dlna.org/industry/about/DLNA_Overview.pdf)).

However, with the conventional method, the amount of meta-information concerning all content increases along with the increase in the number of content. For this reason, there is a problem that a relatively long time may be required to generate an initial screen, and there is also the possibility that the memory resources of the display device may become insufficient. A method in which only the meta-information concerning the content required for display is acquired can be considered as a method for circumventing the problems. However, with such a method, the meta-information required for display is collected each time the display status changes. As a result, a relatively long downtime may arise before the next screen is displayed, and a user cannot search or browse content with ease.

SUMMARY OF THE INVENTION

An embodiment of the present invention provides an information display apparatus and a meta-information display method that realize a highly-responsive interactive user interface while conserving memory resources, even in an environment where multiple contents are present.

According to one aspect of the present invention, there is provided an apparatus comprising: an obtaining unit adapted to obtain meta-information from a plurality of external apparatuses; a cache unit adapted to cache the obtained meta-information per external apparatus that is the source of the meta-information; a display management unit adapted to determine a display order of the cached meta-information and manage display of the meta-information in accordance with the display order; a holding unit adapted to obtain and hold display management information corresponding to the meta-information cached in the cache unit per external apparatus based on a management status of the meta-information managed by the display management unit; a selection unit adapted to select an external apparatus to which a meta-information request is to be made, based on the display management information and a cache status of the meta-information in the cache unit; and a request unit adapted to request the meta-information from the external apparatus selected by the selection unit.

Also, according to another aspect of the present invention, there is provided a method comprising: obtaining meta-information from a plurality of external apparatuses; caching the obtained meta-information per external apparatus that is the source of the meta-information; determining a display order of the cached meta-information and managing display of the meta-information in accordance with the display order; obtaining and holding display management information corresponding to the cached meta-information per external apparatus based on a management status of the meta-information; selecting an external apparatus to which a meta-information request is to be made, based on the display management information and a cache status of the meta-information; and requesting the meta-information from the selected external apparatus.

Further features of the present invention will become apparent from the following description of exemplary embodiments (with reference to the attached drawings).

DESCRIPTION OF THE EMBODIMENTS

Preferred embodiments of the present invention will now be described in detail, in accordance with the accompanying drawings.

First Embodiment

Figure 1:
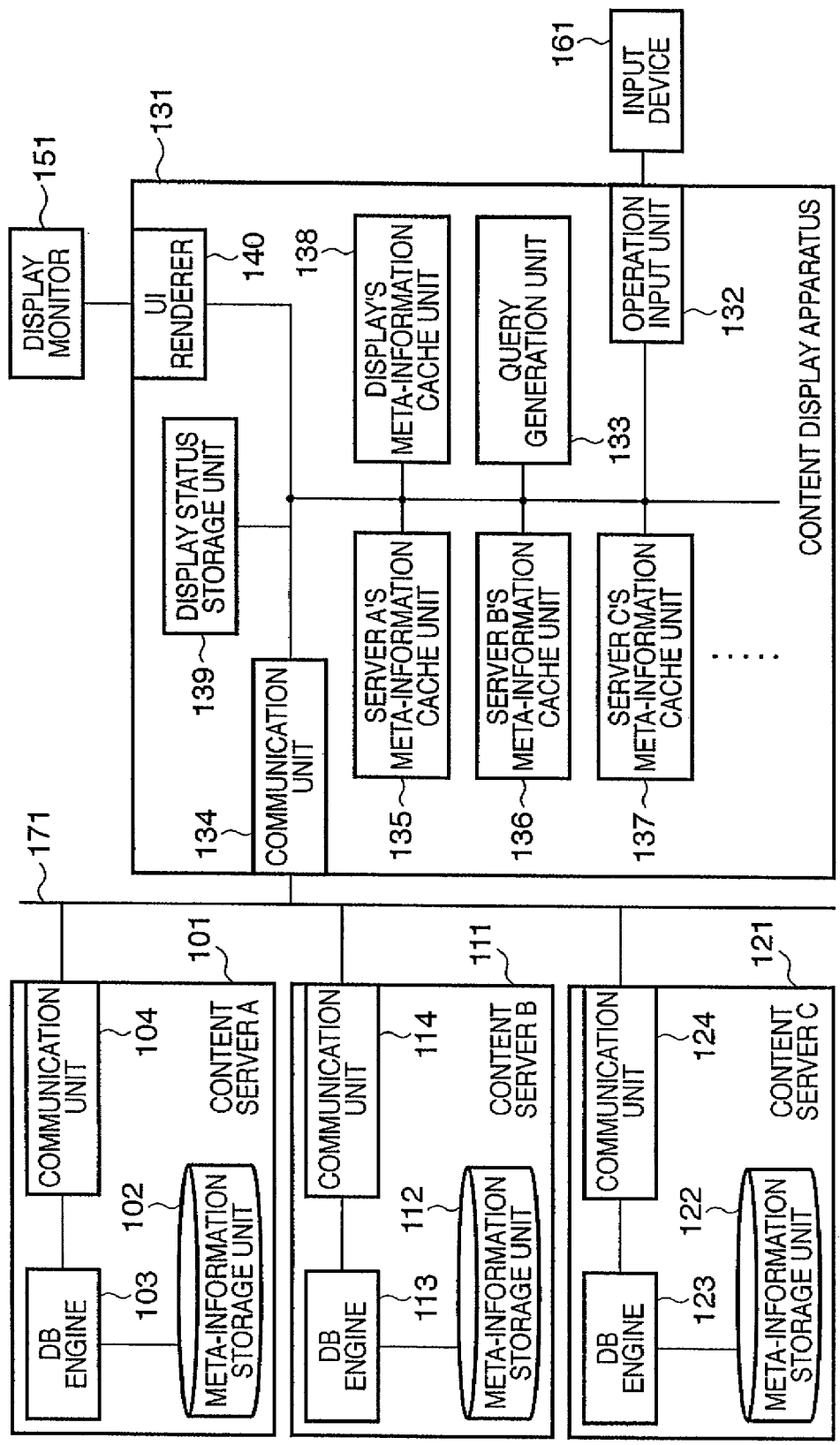
FIG. 1 is a diagram showing an example of the configuration of an information processing system according to a first embodiment.

FIG. 1 is a diagram showing an example of the configuration of an information processing system according to a first embodiment. In FIG. 1, a content server A 101, a content server B 111, and a content server C 121 are storage servers that store digital content. Video content such as moving images and still images, document files as represented by Office documents, and so on can be given as examples of digital content. A meta-information storage unit 102 (112, 122) stores meta-information concerning the stored content. A database engine 103 (113, 123) manages, records, and reads out the meta-information stored in the meta-information storage unit 102 (112, 122). The digital content itself is associated with the meta-information, and is held in a storage unit or a separate area in the meta-information storage units (not shown) that is manageable by the respective content servers. A communication unit 104 (114, 124) sends and receives commands, meta-information, content data, and the like to and from content display apparatus 131.

A content display apparatus 131 retrieves and performs reproduction display of content stored in the content servers (content servers A-C (101, 111, 121) in FIG. 1). A communication unit 134 sends and receives commands, meta-information, content data, and the like to and from content servers. The server's meta-information cache units 135-137 are provided per a connected content server, and cache the meta-information acquired from the corresponding content server. Reference numerals 135-137 are meta-information cache units for server A, server B, and server C respectively. A display's meta-information cache unit 138 caches a display's meta-information in synchronization with the server's meta-information cache units 135-137. To be more specific, the metadata cached in the server's meta-information cache units 135-137 are merged and handled as the display's meta-information. A display status storage unit 139 manages the acquired meta-information and the meta-information being displayed, in synchronization with the server's meta-information cache units 135-137 and the display's meta-information cache unit 138.

A query generation unit 133 determines the content server to acquire meta-information from using information stored in the display status storage unit 139, and generates a meta-information request command. A UI renderer 140 generates a graphical user interface based on the information stored in the display's meta-information cache unit 138. A display monitor 151 displays, for example, the details rendered by the UI renderer 140, or in other words, the graphical user interface. An operation input unit 132 accepts a signal corresponding to an operation performed by a user through an input device 161. The input device 161 is a device for the user to perform operation input, and is provided with a remote controller, keyboard, a pointing device such as a mouse, or the like. The content servers A 101, B 111, and C 121, and the content display apparatus 131, send and receive commands, meta-information, and content data via a network 171. The network 171 is, for example, a local area network. Note that the content servers A 101, B 111, and C 121, and the content display apparatus 131, may be connected wirelessly. In addition, FIG. 1 is a simplified diagram, and thus, devices necessary for connectivity, such as hubs and the like, are not shown. Also, according to the present embodiment, a thumbnail image of the content may be included in the meta-information, along with the content name, content type, date of creation, content size, and so on.

Figure 2:
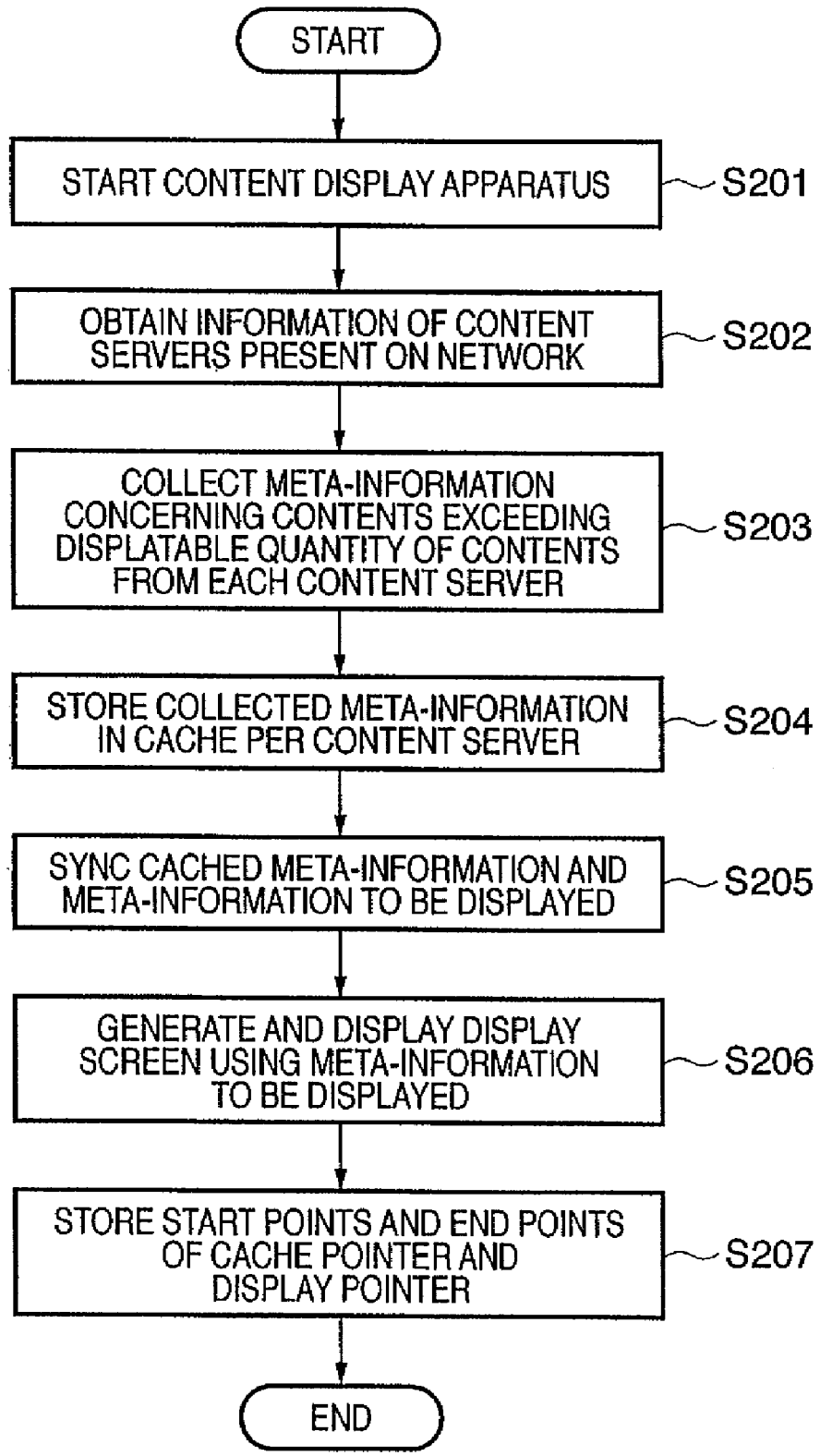
FIG. 2 is a flowchart illustrating meta-information display processing performed by a content display apparatus according to the first embodiment.
Figure 3:
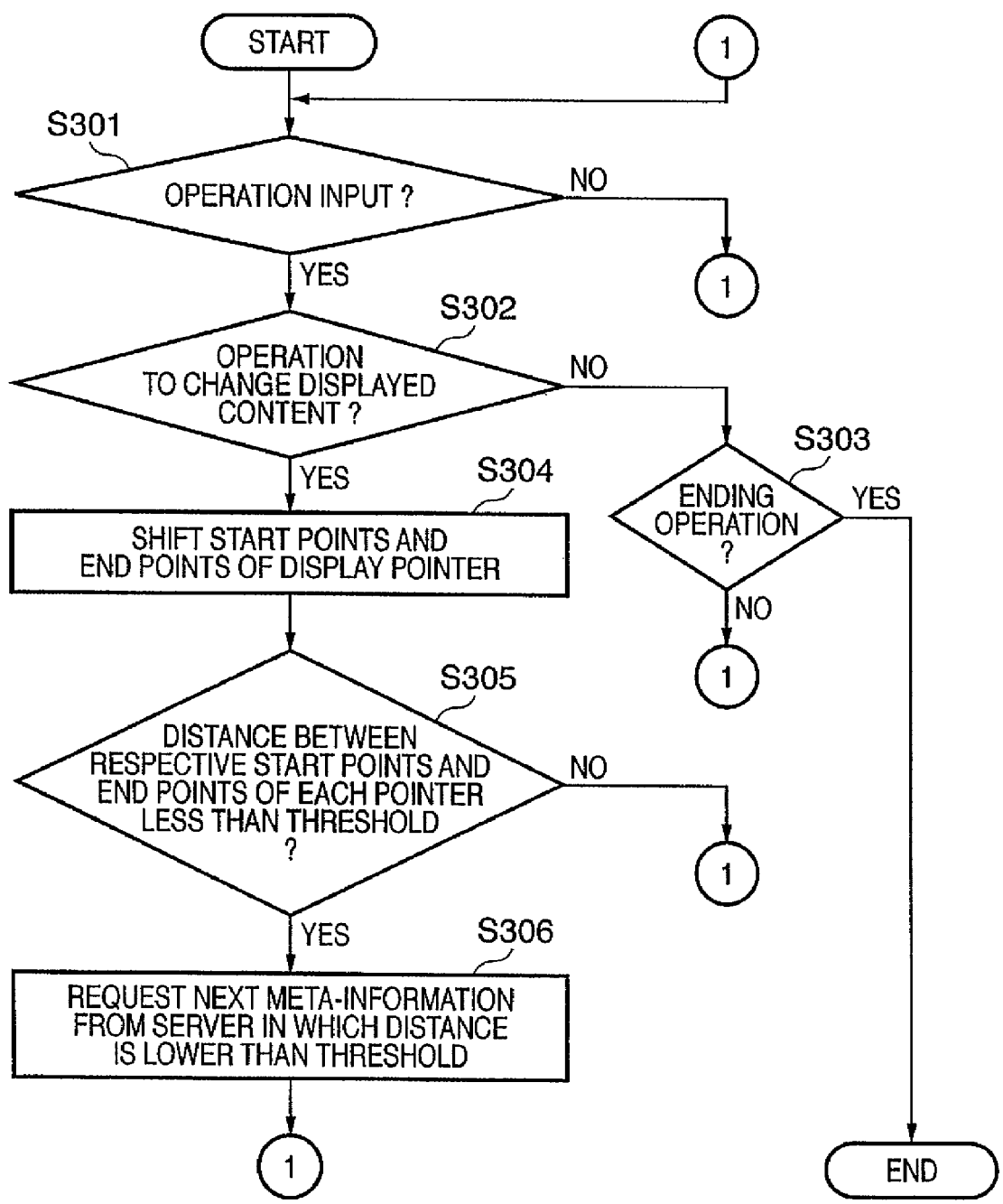
FIG. 3 is a flowchart illustrating a process in a content display apparatus, from when an operation input is performed, to when a meta-information request is made to a content server, according to the first embodiment.

FIGS. 2 and 3 are flowcharts illustrating meta-information display processing performed by the content display apparatus 131 according to the first embodiment. FIG. 2 is a flowchart showing a processing series from the point in time when the content display apparatus 131 of a meta-information display system according to the first embodiment is started up to when display is carried out in the display monitor 151. First, in step S201, the content display apparatus 131 is started up. According to the present embodiment, the content display apparatus 131 is described as performing the processes; however, the display processing described hereinafter may be realized by a generic computer executing a content display application.

Figure 4:
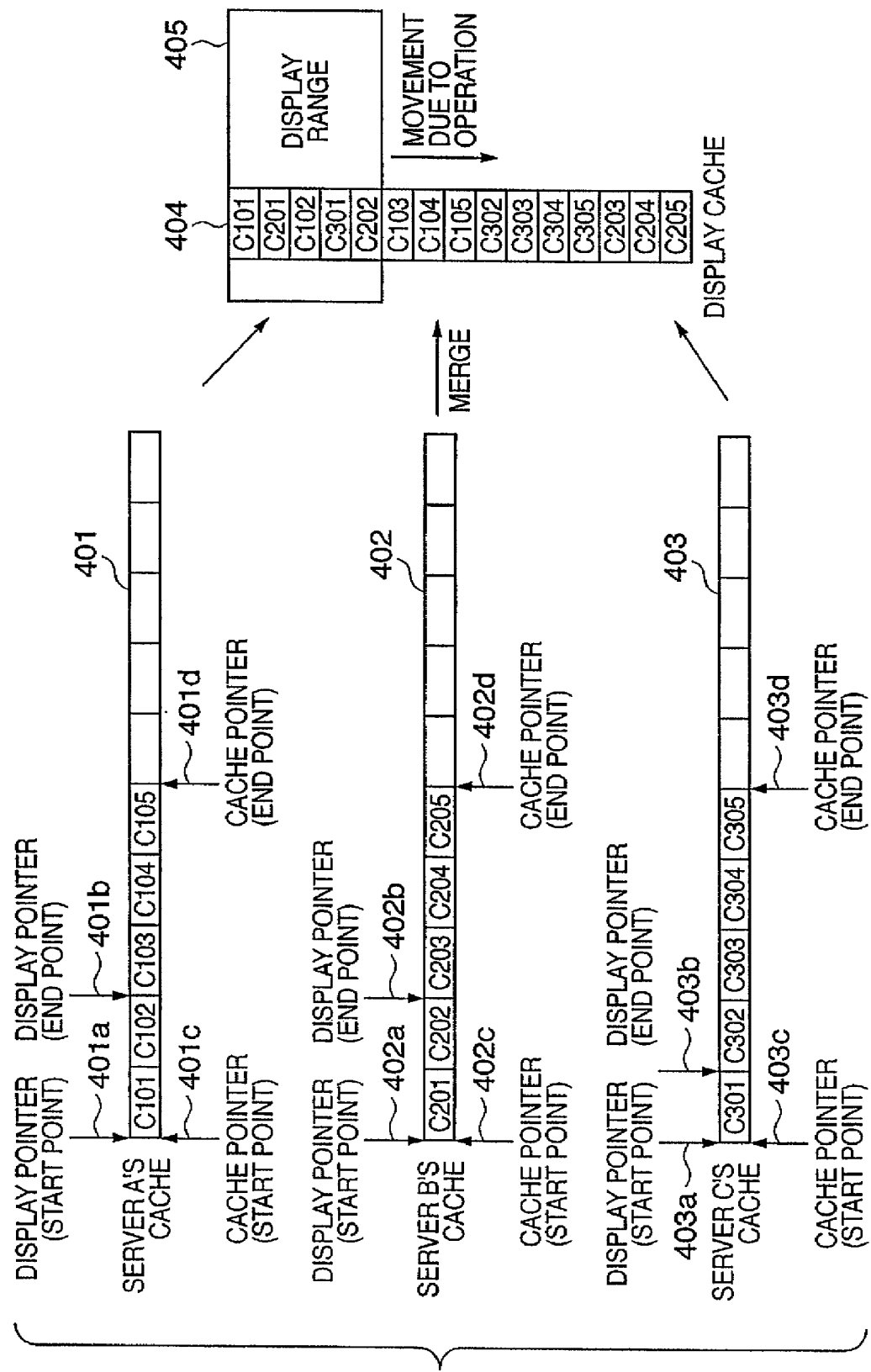
FIG. 4 is a diagram showing a simplified illustration of the details of a server's meta-information cache units, a display's meta-information cache unit, and a display status storage unit of a content display apparatus, at the point in time at which the processing shown in FIG. 2 has ended.

In step S202, the content display apparatus 131 connects to the network 171 via the communication unit 134, searches for content servers (Nos. 101, 111, and 121 in FIG. 1) present on the network 171, and obtains server information. At the present time, discovery of and performance exchange with devices compliant with Universal Plug And Play (UPnP) may be used. Next, in step S203, the content display apparatus 131 obtains meta-information concerning content exceeding a displayable quantity of content, equally from each of the content servers. In FIG. 4, five pieces of meta-information are displayed in a display range 405, and therefore, five pieces of meta-information are obtained from each content server. The reason is that, according to the present method, it is possible to obtain enough meta-information to generate an initial screen even if, for example, the content to actually be displayed is concentrated in a single content server.

In step S204, the content display apparatus 131 stores the collected meta-information in the server's meta-information cache units 135-137, corresponding to the content servers. In addition, in step S205, the content display apparatus 131 stores the resultant of merging the server's meta-information in the display's meta-information cache unit 138, in synchronization with the caching of the server's meta-information in step S204. The display order is determined by date, alphabetical order, or the like. Note that the display's meta-information cache unit 138 may manage pointer information indicating the actual meta-information that is stored in the server's meta-information cache units 135-137.

Next, in step S206, the UI renderer 140 of the content display apparatus 131 uses the meta-information stored in the display's meta-information cache unit 138 to generate a graphical user interface. Then, in step S207, the display status storage unit 139 manages and stores the start points and end points of the cached meta-information and the start points and the end points of the displayed meta-information, on a server-by-server basis. Hereinafter, the management of the start points and the end points of the cached meta-information and the start points and the end points of the displayed meta-information on a server-by-server basis shall be explained, with reference to FIG. 4.

FIG. 4 is a diagram showing a simplified illustration of the details of the server's meta-information cache units 135-137, the display's meta-information cache unit 138, and the display status storage unit 139 of the content display apparatus 131, at the point in time at which the processing shown in FIG. 2 has ended. In FIG. 4, a server A's cache 401, a server B's cache 402, and a server C's cache 403 indicate the details cached in the server's meta-information cache units 135-137 respectively. In addition, a display's cache 404 indicates the details cached in the display's meta-information cache unit 138. Moreover, the display status storage unit 139 manages 4 points, or the start point/end point of a cache pointer and the start point and the end point of a display pointer, per cache of the content server. In other words, regarding the server A's cache 401, a display-pointer start point 401a and an end point 401b, and a cache pointer start point 401c and end point 401d are managed. Furthermore, regarding the server B's cache 402, a display-pointer start point 402a and end point 402b, and a cache pointer start point 402c and an end point 402d are managed. Further still, regarding the server C's cache 403, a display-pointer start point 403a and an end point 403b, and a cache pointer start point 403c and an end point 403d are managed.

FIG. 3 is a flowchart illustrating a process according to the first embodiment, from after display of the meta-information through the processing shown in FIG. 2 is carried out, to when a meta-information request is made to a content server in response to an operation changing the display range 405. In step S301, the content display apparatus 131 waits for an operation input that is made by the user using the input device 161. When an operation input from the input device 161, which is made through the operation input unit 132, is detected (YES in step S301), the process proceeds to step S302 in which the content display apparatus 131 analyzes the details of the operation, and determines whether or not to change the content displayed in the display monitor 151.

In the case where the detected operation input is an operation indicating the end of the content display processing, the process passes through steps S302 and S303 and ends. At the present time, the details of the cache and display status may be discarded, or may be held. On the other hand, in the case where the operation is an operation that changes the content displayed in the display monitor 151 (YES in step S302), the process proceeds to step S304. In step S304, the content displayed in the display monitor 151 is changed in accordance with the operation instruction, and the start point and the end point of the display-pointer are updated.

For example, it is assumed that an operation that shifts the display range 405 downward is inputted in the state shown in FIG. 4. In such a circumstance, in the display's cache 404, meta-information C101 exits the display range 405, and meta-information C103 newly enters the display range 405. In other words, the state in which meta-information C101, C201, C102, C301, and C202 are displayed changes to a state in which C201, C102, C301, C202, and C103 are displayed. Here, meta-information C101 and C103 are pieces of information cached in the server's meta-information cache unit 135. Therefore, the start point 401a and end point 401b of the display-pointer shift to the right in the server A's cache 401 in accordance with the movement of the display range 405. Furthermore, in the case where a similar operation input has been accepted, in the display's cache 404, C201 exits the display range 405, and C104 newly enters the display range 405. Thus, the start point 402a of the display pointer of the server B's cache 402 shifts one place to the right, and the end point 401b of the display-pointer of the server A's cache 401 shifts further to the right, resulting in a state as shown in FIG. 5.

Figure 5:
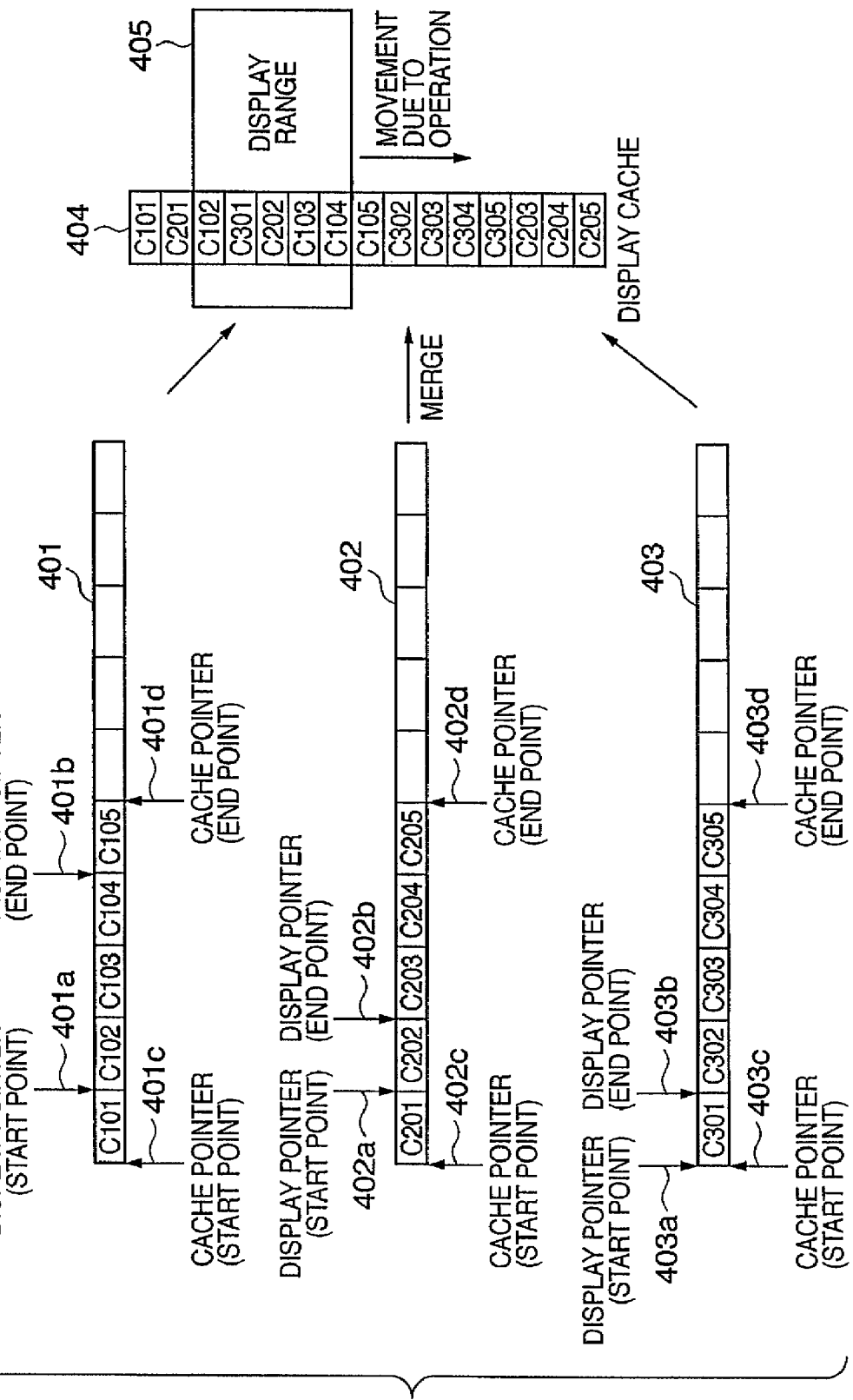
FIG. 5 is a diagram showing a simplified illustration of the details of the server's meta-information cache units, a display's meta-information cache unit, and a display status storage unit of a content display apparatus, at the point in time at which the processing shown in FIG. 3 has ended.

In the state shown in FIG. 5, when an operation input that shifts the display range 405 downward one place further is performed, C105 is newly displayed, and all of the meta-information within the server A's cache 401 is used up. On the other hand, caching occurs in the display's cache 404 as if C302 is displayed after C105. However, in actuality, there is the possibility that C106, which has not yet been obtained from the content server A 101, is inserted after C105. In order to maintain the correctness of the order of contents to be displayed, it is necessary to obtain the meta-information that follows C105 from the content server A 101, before displaying the meta-information C302. However, because the meta-information has been obtained after it has come to be required for the display, some time is required before the content can be displayed. Accordingly, the query generation unit 133 monitors the distance between the respective end points of the display pointer and the cache pointer in the servers A-C's caches 401-403 (step S305). Then, in the case where the distance between the respective end points has become less than a threshold value (YES in step S305), the process proceeds to step S306 in which the next meta-information is requested from the corresponding content server, and pre-reading of the meta-information is carried out.

Figure 6:
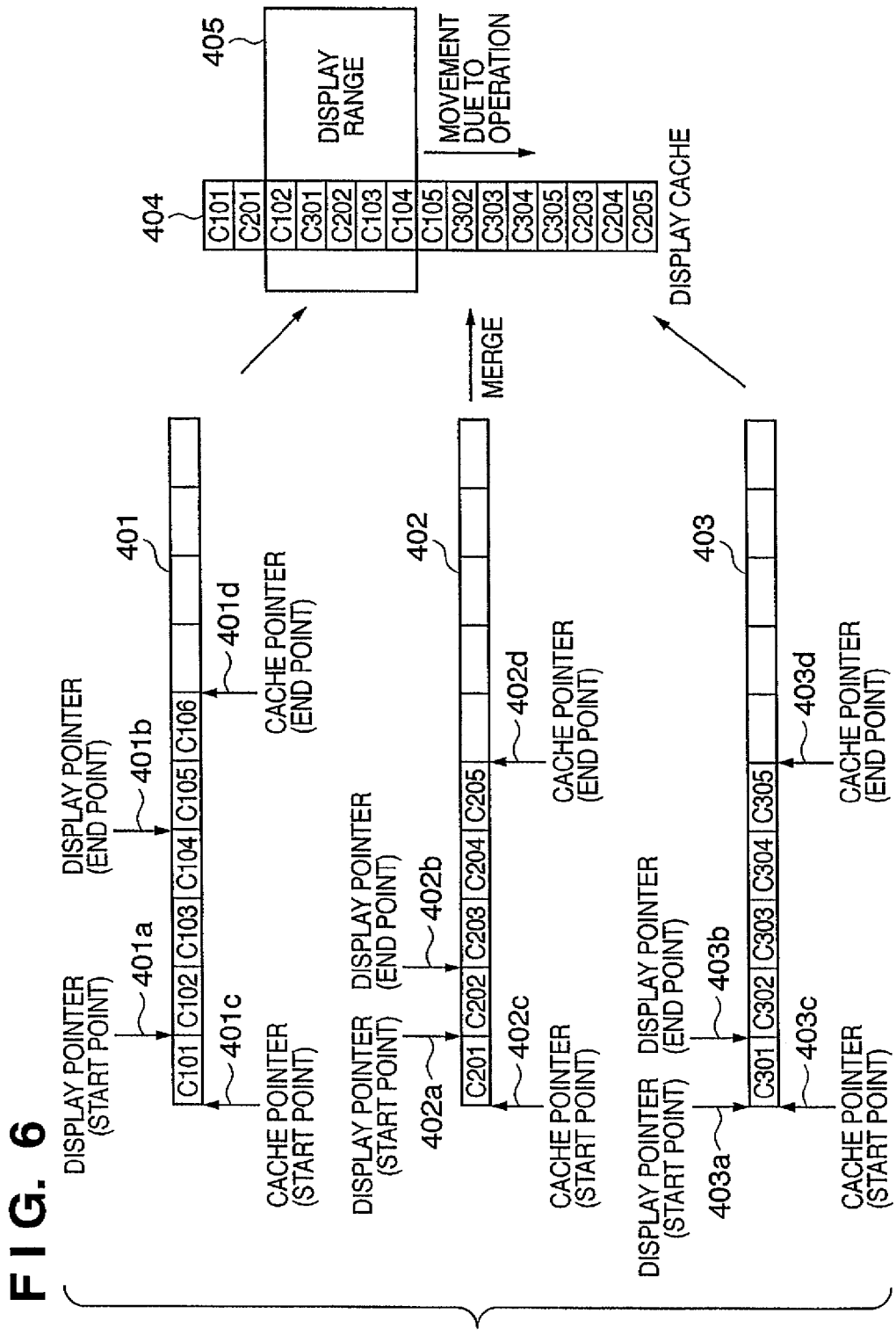
FIG. 6 is a diagram showing an illustration of the details of the server's meta-information cache units, a display's meta-information cache unit, and a display status storage unit of a content display apparatus, after pre-loading meta-information when a threshold value is 1.

For example, in the state shown in FIG. 5, the distance between the end point 401b of the display-pointer and the end-point 401d of the cache pointer in the server A's cache 401 is "1". Therefore, when the threshold value is 1, the query generation unit 133 generates a request command indicating meta-information should be obtained from the content server A 101. As a result, as shown in FIG. 6, new meta-information C106 is obtained from the content server A 101, and the end point 401d of the cache pointer shifts one place to the right. C106 is inserted between C105 and C302 in the display's meta-information cache unit 138, in accordance with, for example, a rule based on the date, alphabetical order, or the like.

Note that in order to effectively use a limited cache area, it is possible to delete, from the server's cache units, meta-information that has exited the display range (the range indicated by the start point and end point of the display pointer) as a result of the movement of the display range. For example, in the case where management is performed using a threshold of "1", it is possible to leave two pieces of meta-information remaining, one at the beginning and one at the end of the display range, and delete the other meta-information. In addition, writing and reading to and from the cache units is performed in a "ring" shape. In other words, for example, in the case where meta-information is written to the right-most end of the server A's cache 401, the next meta-information is written to the left-most end of the cache 401.

Therefore, while an example in which the display range 405 shifts downward is given according to the first embodiment, it is possible to control the pre-reading of the meta-information in the same manner in the case where the display range 405 shifts upward as well. However, in the case where the display range 405 shifts upward, the respective start points of the display pointer and the cache pointer (for example, start point 401a and start point 401c) are monitored. Note that when the caching starts, the cache pointer (start point) and the display pointer (start point) match, but because no meta-information exists before the start points, pre-loading is not executed.

As described thus far, the content display apparatus 131 according to the first embodiment receives, through the communication unit 134, meta-information from a plurality of external devices (content servers) via the network 171. The received meta-information is then cached in cache units (135-

137) per external device (per content server) that is the source of the meta-information. The content display apparatus 131 thereby consolidates the meta-information cached per external device (merges the meta-information, as with the display's cache 404), caches the resultant in the display's meta-information cache unit 138, and uses the information thus cached to manage the display of the meta-information. For example, as shown in FIG. 4, the meta-information within the display range 405 is rendered by the UI renderer 140 and displayed in the display monitor 151. The display status storage unit 139 obtains and holds display management information (start points and end points of the display pointer) corresponding to the meta-information cached per external device, based on the abovementioned display management performed by the display's cache 404. The query generation unit 133 selects an external device from which to request the meta-information, based on the display management information and the cached meta-information (in the present example, based on the cache pointer and the display pointer). Then, the meta-information is requested from the selected external device.

According to the present embodiment, the meta-information is arranged in the order in which it was cached in the server A's cache 401, and the abovementioned display pointer indicates the range in which the meta-information to be displayed is arranged. Therefore, the external device is selected based on the relationship between the range in which the cached meta-information is arranged and the range in which the meta-information to be displayed is arranged. To be more specific, the external device is selected based on the relationship between the respective start points or the respective end points of the range in which the cached meta-information is arranged (the range from the start point to end point of the cache pointer) and the range in which the meta-information to be displayed is arranged (from the start point to the end point of the display pointer). To be even more specific, the query generation unit 133 selects the external device corresponding to the string of meta-information in which the interval between respective start points or respective end points of the cache pointer and the display pointer is smaller than a predetermined value in the cached strings of meta-information. Note that the external device corresponding to the string of meta-information in which the interval between the respective start points or the respective end points of the cache pointer and the display pointer is the smallest in the cached strings of meta-information in the servers A-C's caches 401-403 may be selected.

Moreover, in the case where the interval between respective start points or respective end points of the cache pointer and the display pointer is greater than a set interval in the servers A-C's caches 401-403, the cached meta-information is deleted from the cache.

With the configuration being as described thus far, according to the first embodiment, it is possible to pre-load and cache meta-information that is likely to be required for display by monitoring the display pointer and the cache pointer. In addition, meta-information on the outside of the display pointer interval, which is unlikely to be used in display, is deleted, and thus there is no need for a large cache memory. Hence, according to the first embodiment, it is possible to realize a highly responsive interactive user interface while conserving memory resources, even in an environment where a plurality of content servers are present.

Second Embodiment

Figure 7:
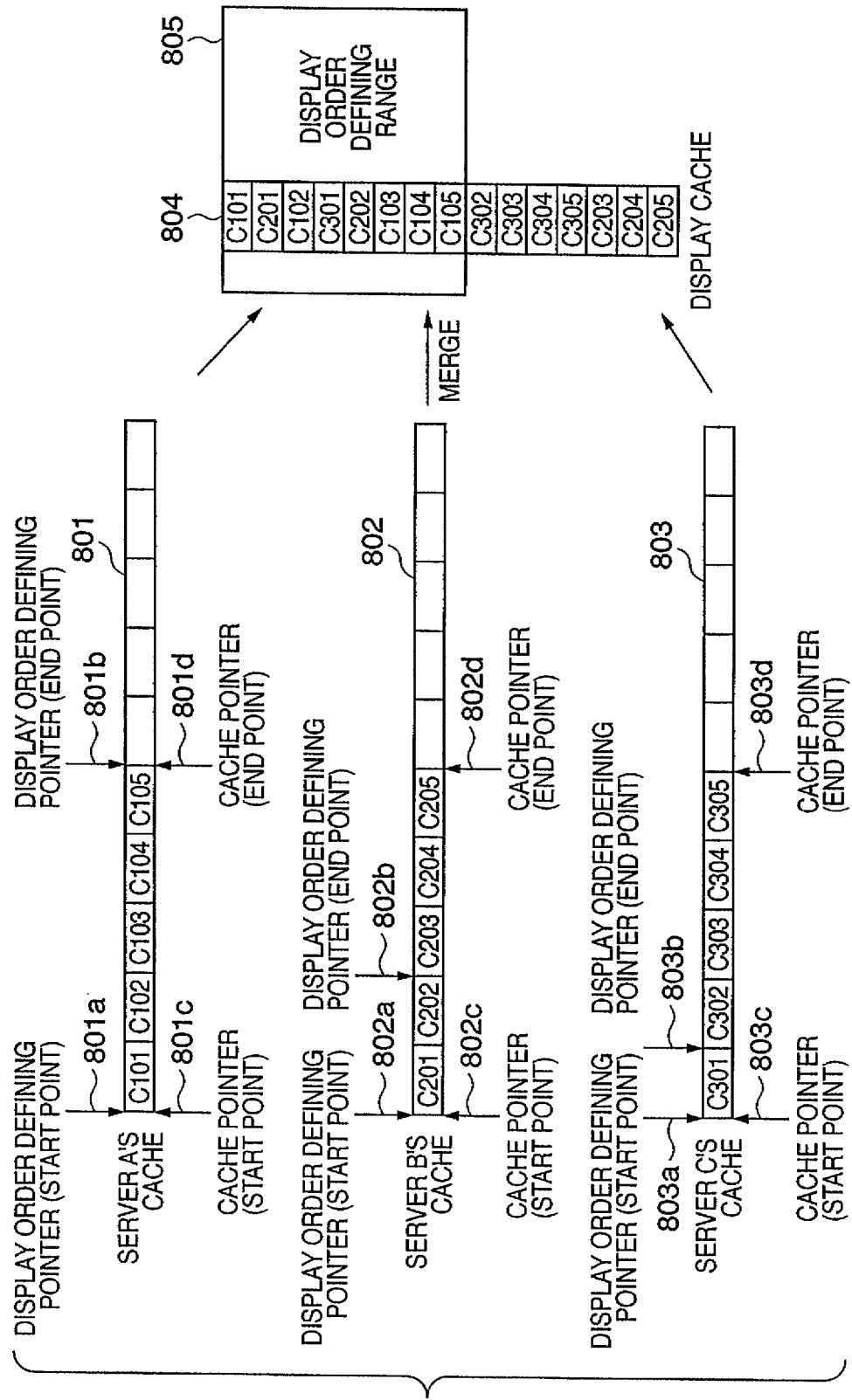
FIG. 7 is a diagram showing an illustration of the details of the server's meta-information cache units, a display's meta-information cache unit, and a display status storage unit of a content display apparatus, according to a second embodiment.

FIG. 7 is a diagram showing a simplified illustration of the details of the server's meta-information cache units 135-137, the display's meta-information cache unit 138, and the display status storage unit 139 of the content display apparatus 131, according to a second embodiment. In FIG. 7, a server A's cache 801, a server B's cache 802, and a server C's cache 803 indicate the details cached in the server's meta-information cache units 135-137 respectively. In addition, a display's cache 804 indicates the details cached in the display's meta-information cache unit 138. Moreover, the display status storage unit 139 manages 4 points, or the start point/end point of a cache pointer and the start point/end point of a display order defining pointer, per cache used for the content server. In other words, regarding the server A's cache 801, a display order defining pointer start point 801a and end point 801b, and a cache pointer start point 801c and end point 801d are managed. Furthermore, regarding the server B's cache 802, a display order defining pointer start point 802a and end point 802b, and a cache pointer start point 802c and end point 802d are managed. Further still, regarding the server C's cache 803, a display order defining pointer start point 803a and end point 803b, and a cache pointer start point 803c and end point 803d are managed.

The servers A-C's caches 801-803 and the display's cache 804 are similar caches as the servers A-C's caches 401-403 and the display's cache 404 described in the first embodiment. In addition, a display order defining range 805 indicates a range in the meta-information already obtained from the content servers in which the display order of the contents is not disturbed even if new meta-information is not obtained. In other words, the display order defining range 805 is a range in which meta-information not yet cached is not forcibly inserted when the meta-information already held in the servers A-C's caches 801-803 is arranged in order, for example, by date. The display order defining range 805 is determined in the following manner. First, the end points (801b, 802b, 803b) of the respective display order defining pointers of the servers A-C's caches 801-803 are shifted to the right in registered order in the display's cache 804. Then, the range in a server's cache until the end point (801d, 802d, 803d) of the cache pointer matches the end point of the display order defining pointer is assumed as the display order defining range 805. In other words, when a display that departs from the display order defining range 805 is performed, it is necessary to collect new meta-information. The start point of the display order defining pointer matches the start point of the cache pointer of a server's cache.

Figure 9:
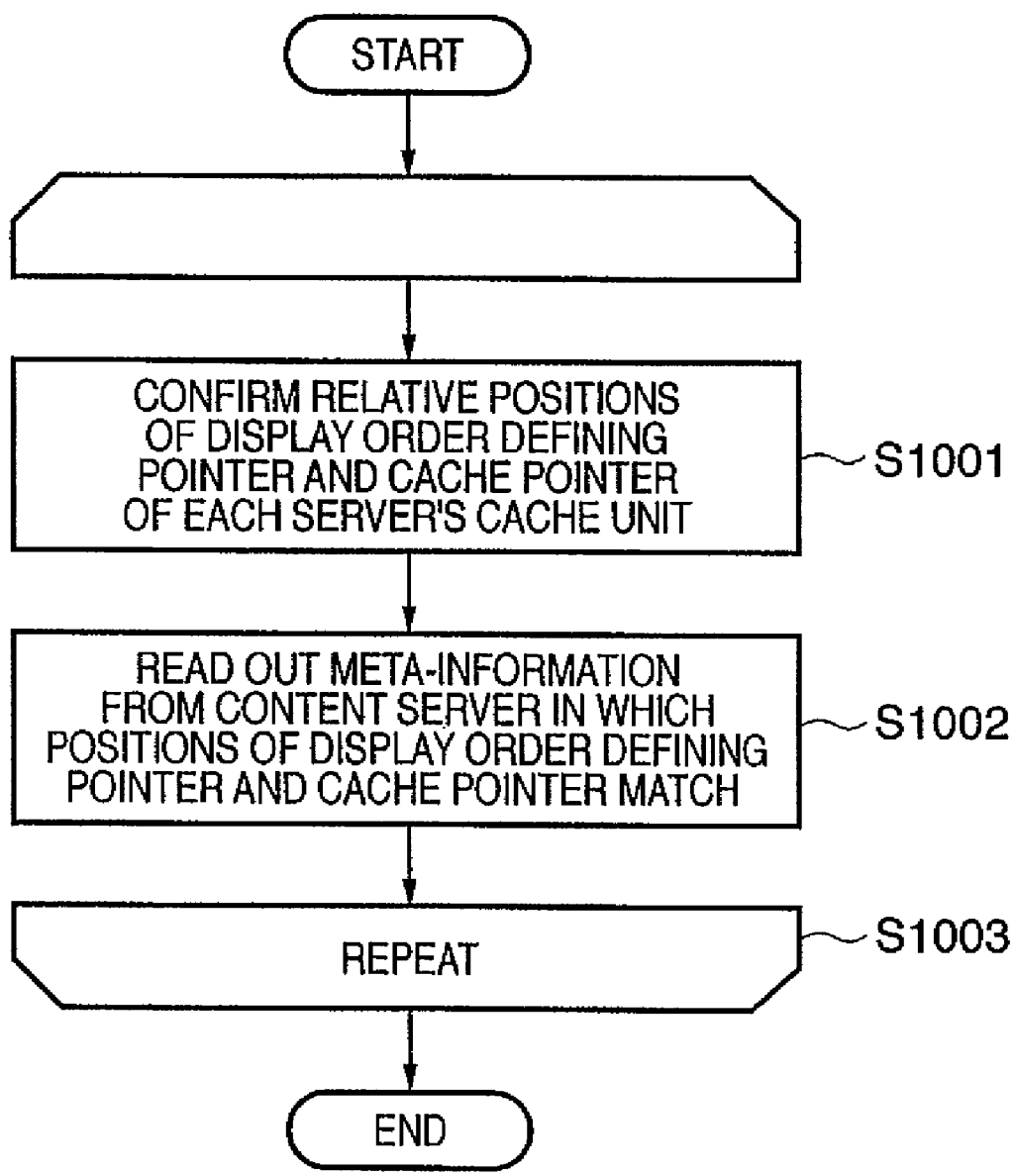
FIG. 9 is a flowchart illustrating a process of obtaining meta-information according to the second embodiment.

FIG. 9 is a flowchart illustrating a process of obtaining meta-information according to the second embodiment. First, in step S1001, the query generation unit 133 confirms the relative positions of the display order defining pointer and the cache pointer in the servers A-C's caches 801-803. In an environment in which more than one content server is present, a content server in which these relative positions match is necessarily present. Next, the next meta-information is pre-read from the content server in which the relative positions of the display order defining pointer and the cache pointer match (step S1002). These processings (step S1001 to step S1002) are repeated until the corresponding content's cache is filled (step S1003). When the servers A-C's caches 801-803 have been filled, in the case where the interval between respective start points or respective end points of the cache pointer and the display pointer is greater than a set interval, the cached meta-information may be deleted from the cache.

Figure 8:
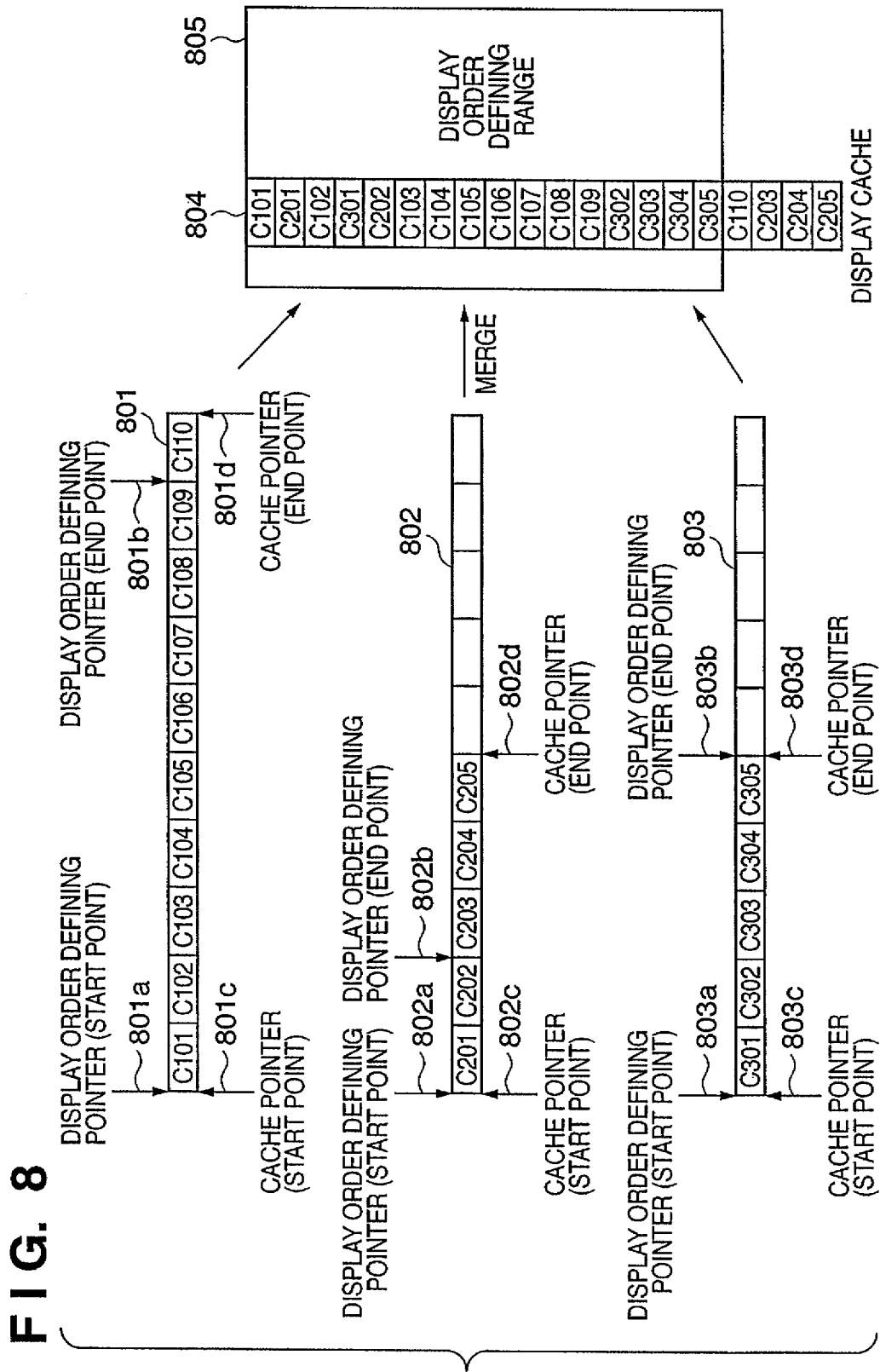
FIG. 8 is a diagram showing an illustration of the details of the server's meta-information cache units, a display's meta-information cache unit, and a display status storage unit of a content display apparatus, after meta-information has been obtained by repeatedly performing pre-loading.

FIG. 8 is a diagram showing the details of the server's meta-information cache units 135-137, the display's meta-information cache unit 138, and the display status storage unit 139 of the content display apparatus 131, after pre-reading has been repeatedly executed and meta-information obtained. FIG. 8 shows the result of the meta-information obtainment processing shown in FIG. 9 being executed for the server A's cache 801, in which the relative positions of the display order defining pointer and the cache pointer match, as shown in FIG. 7. Meta-information C106-C110 is arranged according to a rule such as, for example, by date, by alphabetical order, or the like, and displayed. As a result, the display order defining range 805 is changed to become as shown in FIG. 8, and pre-reading is commenced for the server C's cache 803, in which the end point 803b of the display order defining pointer and the end point 803d of the cache pointer match.

According to the second embodiment described thus far, a display order defining pointer, indicating a range in which the meta-information for which a display order has been defined is arranged in a cached meta-information string arranged in the cached order, is used in the caches 801-803 in FIG. 8. The query generation unit 133 selects an external device based on the relationship between the range in which the cached meta-information is arranged (the range indicated by the cache pointer) and the range in which the meta-information for which the display order has been defined is arranged (the range indicated by the display order defining pointer). For example, the query generation unit 133 selects an external device based on the relationship between the respective starting points or the respective end points of the cache pointer and the display order defining pointer. To be more specific, the query generation unit 133 selects the external device in which the above-mentioned respective start points or respective end points match.

As described thus far, according to the second embodiment, it is possible to carry out pre-read caching of the meta-information without waste even in an environment where a plurality of content servers are present.

Third Embodiment

Next, a third embodiment shall be described. In the cache status as shown in FIG. 8 of the second embodiment, the cache buffer of the server A's cache 801 is in a filled state despite there being empty space in the cache buffers of the server B's cache 802 and the server C's cache 803. For this reason, in the case where a high-speed image shift has been performed, readout of the meta-information held by the content server A 101 is delayed, and as a result, there is the possibility that a delay occurs in the display of the graphical user interface.

Figure 10:
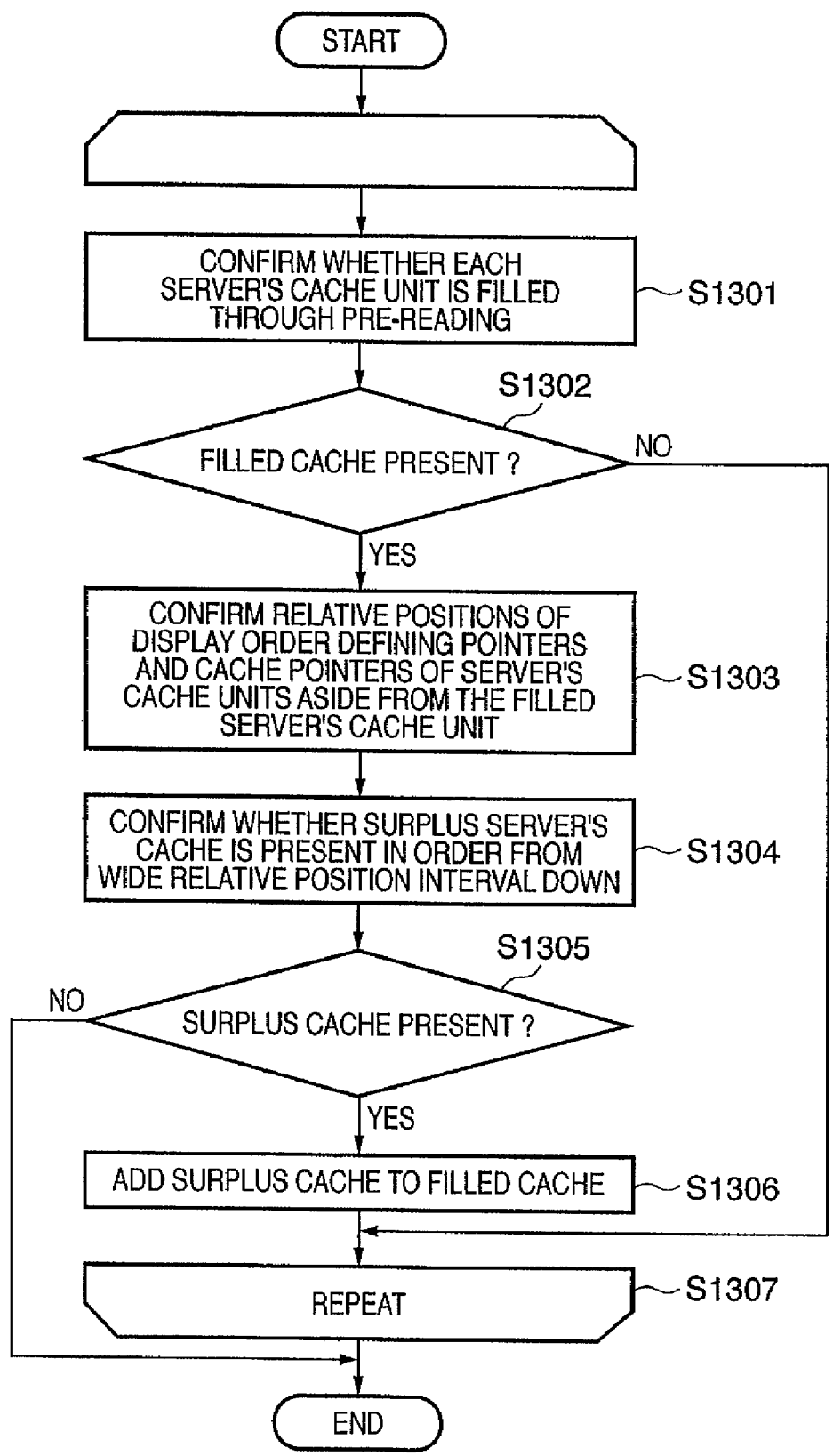
FIG. 10 is a flowchart illustrating a process of changing a cache configuration according to a third embodiment.

FIG. 10 is a flowchart illustrating a process of obtaining meta-information according to the third embodiment. First, in step S1301, the content display apparatus 131 confirms whether each server's meta-information cache unit (135-136) has been filled by the pre-reading. In the case where a filled server's meta-information cache unit is present, the process moves from step S1302 to S1303, and the relative positions of the display order defining pointer and the cache pointer of the server's cache aside from the filled server's cache are confirmed. Then, in step S1304, it is confirmed whether there is a surplus server's cache, in order from a high interval between relative positions down. Note that a "surplus server's cache" means a server's cache having an area in which meta-information is not present. In the case where a surplus server's cache is present, the process moves from step S1305 to step S1306, and the surplus server's cache is added to a filled server's cache. These processings (step S1301 to step S1306) are repeated until no more surplus server's caches are present (step S1307).

Figure 11:
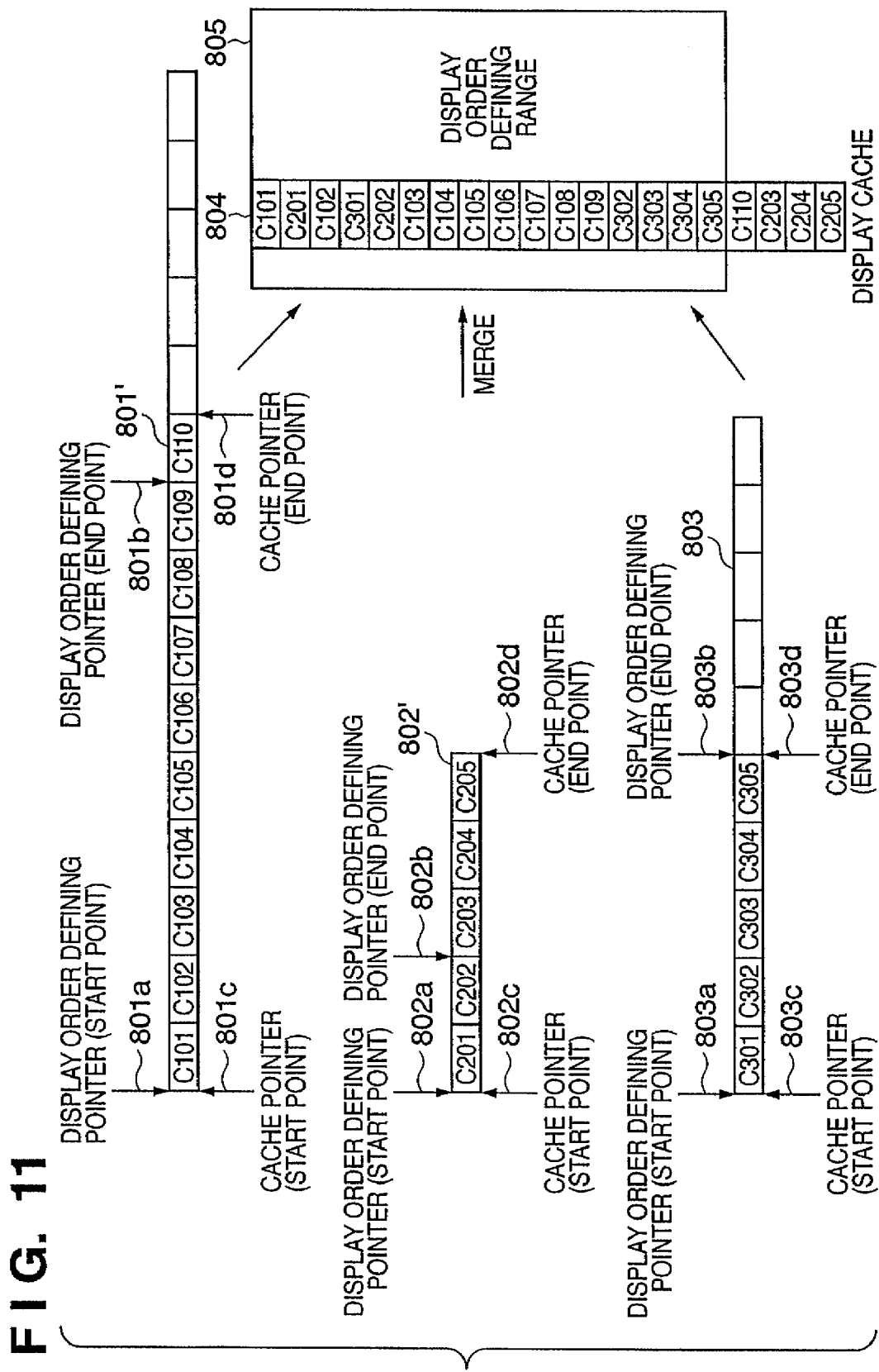
FIG. 11 is a diagram illustrating the details of the server's meta-information cache units, a display's meta-information cache unit, and a display status storage unit after processing of changing the cache configuration has been performed according to the third embodiment.

FIG. 11 is a diagram showing an example of a state in which a surplus cache (the server B's cache 802) is added to a filled cache (the server A's cache 801) through the above processing. Compared to FIG. 8, in FIG. 11, the surplus part of the server B's cache 802 is added to the end of the server A's cache 801, which in turn becomes a server A's cache 801'. On the other hand, having had the surplus part cut, the server B's cache 802 becomes a cache 802'. This is the result of adding the surplus part of the server B's cache 802 to the server A's cache 801 after confirming the relative positions of the display order defining pointer and the cache pointer of server's caches aside from the filled server's caches, in accordance with the abovementioned processing flow shown in FIG. 10.

According to the third embodiment, when the allocated resources in a cache have been exhausted, these resources are replenished using another cache. For example, in the case where the resources of the server A's cache 801 have been exhausted, the amount of offset between the range in which the meta-information cached in another cache (802 or 803) is arranged and the range in which the meta-information for which the display order has been defined is arranged is determined. A cache is selected in order from the largest offset down, and the surplus resources of the selected server's cache are allocated to the cache 801.

As described thus far, according to the above embodiments, it is possible to carry out pre-read caching of the meta-information without waste using limited memory resources even in an environment where a plurality of content servers are present.

As described thus far, according to the above embodiments, in an environment having decentralized storage servers, meta-information collected by display devices is managed per server that obtains the meta-information. Then, because the server is specified as necessary and the minimum necessary meta-information is acquired, it is possible to realize a highly-responsive graphical user interface while conserving memory resources.

Note that the case where the functionality of the above-mentioned embodiments is achieved by directly or remotely supplying a software program to a system or device and reading out and executing the supplied program code through a computer in the system or device is included in the scope of the present invention. In this case, the supplied program is a program corresponding to the flowchart indicated in the drawings in the embodiments.

Accordingly, the program code itself, installed in a computer so as to realize the functional processing of the present invention through a computer, also realizes the present invention. In other words, the computer program itself, for realizing the functional processing of the present invention, is also included within the scope of the present invention.

In this case, a program executed through an interpreter, script data supplied to an OS, or the like may be used, as long as it has the functionality of the program.

The following can be given as examples of storage mediums for supplying the program: a floppy disk, a hard disk, an optical disk, a magneto-optical disk, an MO, a CD-ROM, a CD-R, a CD-RW, magnetic tape, a non-volatile memory card, a ROM, a DVD (DVD-ROM, DVD-R), or the like.

Using a browser of a client computer to connect to an Internet homepage and downloading the computer program of the present invention to a storage medium such as a hard disk can be given as another method for supplying the program. In this case, the downloaded program may be a compressed file including a function for automatic installation. Furthermore, this method may be realized by dividing the program code that makes up the program of the present invention into a plurality of files and downloading each file from different homepages. In other words, a WWW server that allows a plurality of users to download the program files for realizing the functional processing of the present invention through a computer is also included within the scope of the present invention.

In addition, the program of the present invention may be encrypted, stored on a CD-ROM or the like, and distributed to a user. In this case, a user that has cleared a predetermined condition is allowed to download key information for removing the cryptography from a homepage via the Internet, use the key information to decrypt the program, and install the program on a computer.

In addition to a computer realizing the functionality of the aforementioned embodiments by executing a read-out program, the functionality of the embodiments may be realized through cooperation with an OS or the like running on the computer, based on instructions of the program. In this case, the OS or the like performs part or all of the actual processing, and the functionality of the aforementioned embodiments is realized through this processing.

Furthermore, part or all of the functionality of the aforementioned embodiments may be realized by a memory provided in a function expansion board installed in the computer, a function expansion unit connected to the computer, or the like, into which the program read out from the storage medium is written. In this case, after the program has been written into the function expansion board, function expansion unit, or the like, a CPU or the like provided in the function expansion board, function expansion unit, or the like executes part or all of the actual processing based on instructions of the program.

According to the present invention, it is possible to realize a highly-responsive interactive user interface while conserving memory resources, even in an environment where multiple contents are present.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-249956, filed Sep. 14, 2006, which is hereby incorporated by reference herein in its entirety.

What is claimed is:

1. An apparatus comprising:
a computer that includes a processor;
an obtaining unit, implemented by the computer, that obtains a plurality of meta-information corresponding to a plurality of digital contents from each of a plurality of external apparatuses;
a cache unit, implemented by the computer, that allocates cache areas corresponding to the plurality of external apparatuses in a memory and caches the obtained meta-information in the cache area in an order defined by a predetermined condition per external apparatus that is the source of the meta-information;
a display management unit, implemented by the computer, that merges the meta-information cached per external apparatus in the order defined by the predetermined condition to determine a display order of the cached meta-information and manages display of the meta-information in accordance with the display order;
a holding unit, implemented by the computer, that obtains and holds display management information corresponding to the meta-information per external apparatus cached in each of the cache areas based on a management status of the meta-information managed by the display management unit;
a selection unit, implemented by the computer, that selects an external apparatus from the plurality of external apparatuses, to which a meta-information request is made, based on the display management information and a cache status of the meta-information in each of the cache areas; and
a request unit, implemented by the computer, that requests the meta-information from the external apparatus selected by the selection unit,
wherein the display management information indicates a range in which the meta-information displayed by the display management unit is arranged, from among the meta-information arranged in the order in which the meta-information has been cached in the cache unit, and
the selection unit selects the external apparatus based on a relationship between the range in which the meta-information cached in the cache unit is arranged and the range in which the meta-information displayed is arranged.

2. The apparatus according to claim 1,
wherein the selection unit selects the external apparatus based on a relationship between the respective start points or respective end points of the range in which the cached meta-information is arranged and the range in which the meta-information displayed is arranged.

3. The apparatus according to claim 2,
wherein the selection unit selects the external apparatus corresponding to meta-information cached in the cache unit in which the interval between the respective start points or respective end points is the lowest.

4. The apparatus according to claim 2,
wherein the selection unit selects the external apparatus corresponding to the meta-information cached in the cache unit in which the interval between the respective start points or respective end points is lower than a predetermined value.

5. The apparatus according to claim 1, further comprising:
a deletion unit, implemented by the computer, that deletes the cached meta information from the cache unit in the case where, in the cache unit, the interval between the respective start points or the respective end points is greater than a defined interval.

6. The apparatus according to claim 1,
wherein the display management information indicates a range in which the meta-information for which a display order has been defined by the display management unit is arranged, from among the meta-information arranged in the order in which the meta-information has been cached in the cache unit, and
the selection unit selects the external apparatus based on a relationship between the range in which the meta-information cached in the cache unit is arranged and the range in which the meta-information for which a display order has been defined is arranged.

7. The apparatus according to claim 6,
wherein the selection unit selects the external apparatus based on a relationship between the respective start points or respective end points of the range in which the cached meta-information is arranged and the range in which the meta-information for which a display order has been defined is arranged.

8. The apparatus according to claim 7, wherein the selection unit selects the external apparatus corresponding to the meta-information cached in the cache unit in which the respective start points or the respective end points match.

9. The apparatus according to claim 6, further comprising:
a resource assignment unit, implemented by the computer, that, in the case where a cache unit that has exhausted resources assigned to the cache unit is present among the cache units, selects other cache units in order starting with the cache unit in which the offset between the range in which the cached meta-information is arranged and the range in which the meta-information displayed is arranged is largest, and assigns the surplus resources of the selected cache unit to the cache unit that has exhausted the resources assigned to the cache unit.

10. A computer-implemented method comprising:
obtaining a plurality of meta-information corresponding to a plurality of digital contents from each of a plurality of external apparatuses;
allocating cache areas corresponding to the plurality of external apparatuses in a memory and caching the obtained meta-information in the cache area in an order defined by a predetermined condition per external apparatus that is the source of the meta-information;
merging the meta-information cached per external apparatus in the order defined by the predetermined condition to determine a display order of the cached meta-information and managing display of the meta-information in accordance with the display order;
obtaining and holding display management information corresponding to meta-information per external apparatus cached in each of the cache areas based on a management status of the meta-information;
selecting an external apparatus from the plurality of external apparatuses, to which a meta-information request is made, based on the display management information and a cache status of the meta-information for each of the cache areas; and
requesting the meta-information from the selected external apparatus,
wherein the display management information indicates a range in which the meta-information displayed is arranged, from among the meta-information arranged in the order in which the meta-information has been cached, and
the selection step comprises selecting the external apparatus based on a relationship between the range in which the meta-information cached is arranged and the range in which the meta-information displayed is arranged.

11. A storage medium storing instructions which, when executed by an apparatus, causes the apparatus to execute the method of claim 10.

* * * * *